United States Patent [19]
Helm

[11] Patent Number: 5,636,654
[45] Date of Patent: Jun. 10, 1997

[54] FUEL EQUALIZATION LINE FOR VEHICLES AND METHOD OF USING SAME

[76] Inventor: C. Bradford Helm, 4023 Sweetwater Rd., Bonita, Calif. 91902

[21] Appl. No.: 392,130

[22] Filed: Feb. 22, 1995

[51] Int. Cl.[6] ................................................. F17D 1/13
[52] U.S. Cl. ........................... 137/15; 137/315; 137/265; 137/572; 280/835
[58] Field of Search ............................. 137/265, 572, 137/614.04, 15, 315; 285/175; 280/835

[56] References Cited

U.S. PATENT DOCUMENTS

| 581,050 | 4/1897 | Wentz | 285/175 |
|---|---|---|---|
| 2,840,147 | 6/1958 | Almsteod | 137/265 |
| 4,653,762 | 3/1987 | Nakamura et al. | 280/835 |
| 4,886,087 | 12/1989 | Kitchen | 137/614.04 |

*Primary Examiner*—John Rivell
*Attorney, Agent, or Firm*—Bernard L. Kleinke; Peter P. Scott

[57] ABSTRACT

A fuel equalization line device couples in fluid communication vehicle tanks and has one or two conduits joined together by a removable coupling device, which provides for fluid communication between the conduits when engaged to equalize fuel levels within the tanks, and enables the fuel equalization line to be separated into two parts to free the tanks from the vehicle frame during a tank removal operation. A pair of shutoff valves enable the fuel to be retained in the tanks when they are removed from the frame.

10 Claims, 1 Drawing Sheet

FUEL EQUALIZATION LINE FOR VEHICLES AND METHOD OF USING SAME

TECHNICAL FIELD

The present invention relates, in general, to a new and improved fuel equalization line for vehicles and method of using it. It more particularly relates to a fuel equalization line that enables a user to remove rapidly and safely a fuel tank, or multiple fuel tanks, from a vehicle, such as a motorcycle.

BACKGROUND ART

Motorcycle fuel tanks are commonly configured in one of two ways. Either there are two separate fuel tanks, one on each side of a central upper frame member, or there is one fuel tank having a pair of lower lobes on either side of the central upper frame member. With either fuel tank configuration, a fuel equalization line is required.

A fuel equalization line is a tube or conduit that extends between two ports in the bottom portion of the fuel tank or tanks. In the case where two separate fuel tanks exist, the fuel equalization line allows for fluid communication between the two separate fuel tanks. In this way, the fuel level will remain uniformly constant in the two fuel tanks. This facilitates the uniform draining of fuel from both tanks as fuel is consumed by operation of the engine.

Likewise, in the case where one fuel tank is used, the fuel equalization line allows the fuel level within the two lower lobes of the fuel tank to remain uniformly constant, essentially facilitating the uniform draining of fuel from the fuel tank as fuel is consumed.

Because the fuel equalization line commonly extends through a small opening in the frame, it makes it difficult, if not impossible, to remove the tank or tanks from the frame without draining or losing fuel stored in the tanks. In this regard, the fuel equalization line traps or captures the tank on the frame.

When this is the case, the only technique to remove completely the tank or tanks from the vehicle frame is to remove initially the fuel equalization line from the tank or tanks. In this manner, they become free of the frame, and can then be dismounted therefrom. However, there is a problem. When the fuel equalization line is removed, fuel spills from the tanks. For this reason, fuel within the tanks must first be drained prior to removing the fuel equalization line, and subsequently disassembling the tanks from the frame.

Depending on the level of fuel within the tank, draining the tanks can be time consuming and can take about 15 minutes to drain completely the retained fuel. From a maintenance service provider's prospective, such a delay can be inconvenient and interfere with orderly business procedures. Therefore, it would be desirable to have an arrangement whereby the fuel is safely retained within the tanks for removal, or the fuel tanks can be more rapidly drained, so that the maintenance procedure can begin promptly.

Additionally, when a motorcycle first comes in for cleaning, repair or maintenance, the engine may still be quite hot from recent operation. When the engine is still hot, it may present a serious danger to the draining of the highly combustible fuel from the tanks. Therefore, it would be highly desirable to have a technique for enabling the fuel to be safely retained within the fuel tanks or quickly removed therefrom, and at the same time for facilitating the rapid removal of those fuel tank or tanks from the motorcycle.

At the present time, one way to drain fuel from a motorcycle fuel tank is to open the petcock in the fuel supply line to the carburetor. The fuel can be directed into a holding vessel by either allowing the fuel to freely drain by gravity, or by connecting a length of hose below the petcock and directing the draining fuel into the vessel. Following the draining step, the conventional fuel equalization line is disconnected from one or both fuel tanks, thereby allowing the fuel tanks to be removed from the vehicle. This process is time consuming and certain tools are required to accomplish the task.

Given the number of times motorcycles are disassembled for cleaning, maintenance, or repair operations, this conventional approach to removing the fuel tank or tanks becomes a major inconvenience. Therefore, it would be highly desirable to have a new and improved device and method for removing rapidly and safely a fuel tank or tanks from vehicles, such as motorcycles, in an efficient and cost effective manner.

DISCLOSURE OF INVENTION

Therefore, the principal object of the present invention is to provide a new and improved device and method of using it to enable a fuel tank or multiple fuel tanks to be rapidly and efficiently removed from a vehicle to permit for cleaning, maintenance, or repair of the vehicle in a cost effective manner.

Another object of the present invention is to provide such a new and improved device and method of using it to enable a user to retain fuel within a vehicle fuel tank, or tanks, and, at the same time, permit the safe removal of the fuel tank, or tanks in a fast and convenient manner.

Briefly, the above and further objects of the present invention are realized by providing a new and improved fuel equalization line device and method of using it, to enable the fuel tank, or tanks, to be removed from a vehicle, such as a motorcycle, in a rapid, safe, efficient and cost effective manner.

The fuel equalization line device couples in fluid communication vehicle tanks and includes one or two conduits joined together by a removable coupling device, which provides for fluid communication between the conduits when engaged to equalize fuel levels within the tanks, and enables the fuel equalization line to be separated into two parts to free the tanks from the vehicle frame during a tank removal operation. A pair of shutoff valves enable the fuel to be retained in the tank or tanks when they are being removed from the frame.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
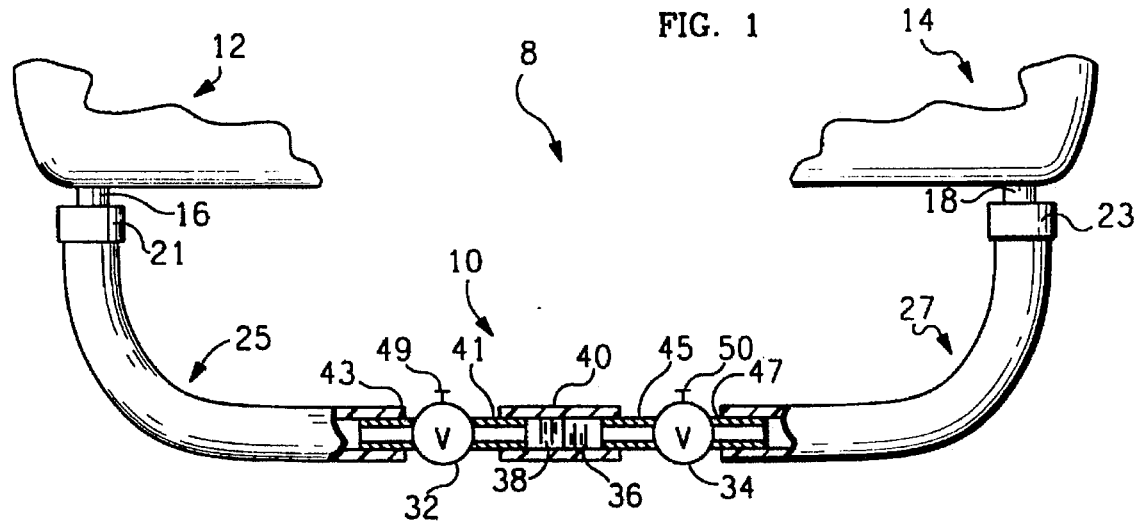
FIG. 1 is a partially diagrammatic elevational view of a fuel equalization line device, constructed in accordance with the present invention.

Referring now to the drawings, and more particularly to FIG. 1 thereof, there is shown a new fuel equalization line device 8, which is constructed in accordance with the present invention. The fuel equalization line device 8 is connected in fluid communication between a pair of conventional motorcycle fuel tanks 12 and 14 via their respective ports 16 and 18 to help maintain a uniform fuel level within the fuel tanks 12 and 14. The device 8 extends through an opening in a motorcycle frame (not shown) under the tanks 12 and 14.

While the invention is shown and described herein for use with motorcycles, it may be used in connection with other vehicles such as motor scooters, mopeds, and all terrain vehicles.

The fuel equalization line device 8 generally comprises a pair of conduits 25 and 27 having hose ends 21 and 23, respectively, which facilitates a firm attachment to the fuel tank ports 16 and 18, extending from fuel tanks 12 and 14, respectively. Centrally disposed between the pair of conduits is a coupling assembly 10 to enable the fuel equalization line device 8 to be separated into two ports in order to free the fuel tanks 12 and 14 from the motorcycle frame (not shown). A pair of valve assemblies 32 and 34 interconnected by coupling 40, enable the fuel to be retained in the tanks 12 and 14 while they are being removed from the frame (not shown).

In operation, when the valves 32 and 34 are both in the open position, the conduits 25 and 27 are in fluid communication, and fuel is allowed to freely flow through the coupling assembly 10 between the conduits 25 and 27 and thus, between fuel tanks 12 and 14. In this manner, fuel levels within fuel tanks 12 and 14 remain substantially equal.

In order to remove the fuel tanks 12 and 14 from the motorcycle (not shown), both valves 32 and 34 are closed off manually, thereby retaining the fuel upstream from the valve gates (not shown) within valves 32 and 34. Next, the threaded coupling is unthreaded manually from one or both of the threaded valve stems 36 and 38 thereby disconnecting the valves 32 and 34. The fuel tanks 12 and 14 can now be disassembled from the motorcycle (not shown) quickly and efficiently without draining the fuel from each tank beforehand. This results in a safe work environment, especially when one considers that the engine may still be hot due to recent operation.

Another approach would be to drain the fuel tanks 12 and 14 via the fuel equalization line device 8. To accomplish this task, valves 32 and 34 would be left in the open position. The valves 32 and 34 would then be disengaged from each other by unthreading them from coupler 40. When disengaged, fuel freely flows through the conduits 25 and 27 and the valves 32 and 34, and can be directed into a holding vessel (not shown). In this way, the draining of fuel from the fuel tanks can be accomplished much more rapidly than when draining occurs via the petcock. To do this, coupler 40 is unthreaded from the threaded portions 36 and 38 of one or both valves 32 and 34, to separate the fuel equalization line device 8. The distal ends of the separated fuel equalization line 8 are then lowered to allow the fuel within fuel tanks 12 and 14 to drain, quickly by gravity, directly into a fuel holding vessel (not shown). As a result, the fuel draining operation is accomplished in a rapid and efficient manner. Moreover, a safe working environment is preserved as spilled fuel is kept to a minimum by the controlled draining of the fuel tanks via the conduits 25 and 27 and valves 32 and 34.

Considering now the valves in greater detail, each valve includes a valve stem with hose barbs (not shown) and an opposing threaded valve stem. The valve 32 has a stem 43 which is directly connected to conduit 25 via hose barbs (not shown), and an opposing threaded stem 41 for connection removably to the coupler 40. Likewise, the valve 34 includes a stem 47 connected to the conduit 27 via hose barbs (not shown), and an opposing threaded stem 45 for connection removably to the other end of the coupler 40. The valves 32 and 34 are interconnected with threaded portions 36 and 38 adjacent to each other, and in fluid communication, by threaded coupling 40.

Each valve 32 and 34 has a manual control knob 49 and 50, respectively, to control opening and closing off the valve manually.

Figure 2:
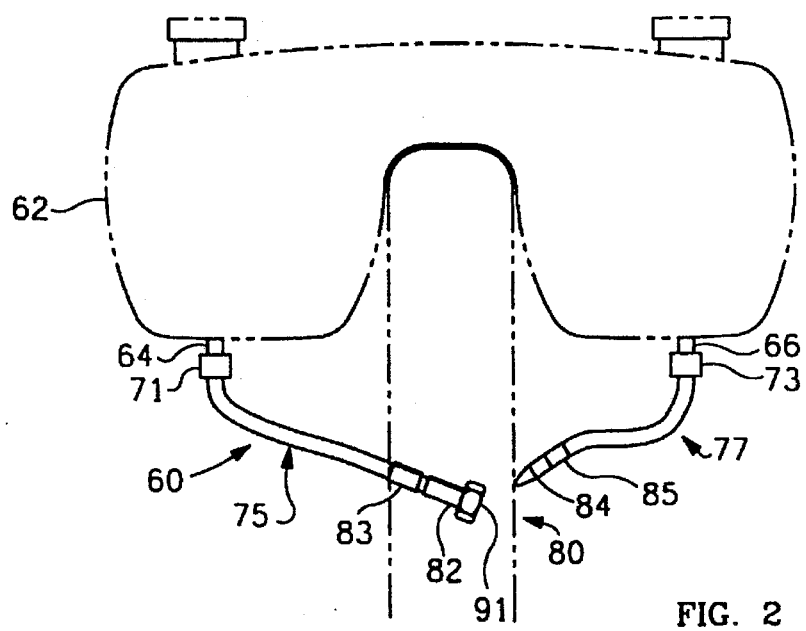
FIG. 2 is a pictorial view of another fuel equalization line device, constructed in accordance with the present invention.

Referring now to FIG. 2, there is shown another fuel equalization line device 60 which is constructed in accordance with the present invention, and which is similar to the fuel equalization line device 8 in FIG. 1, except that fuel equalization line device 60 includes a quick connect/disconnect valve assembly 80 in place of the coupling assembly 10 are shown in FIG. 1.

FIG. 2 illustrates in phantom lines the positional location of a fuel tank 62 with respect to a motorcycle frame member 63. Fuel tank 62 is a singular vessel with dual lower portions, both of which include ports 64 and 66. One end of conduits 75 and 77 are affixed to the fuel tank ports 64 and 66, respectively, using hose ends 71 and 73. It should be understood by one skilled in the art that these hose ends could be hose clamp devices, clamps, or other types of hose crimping or fastening means.

The other end of conduits 75 and 77 are affixed to the quick connect/disconnect valve assembly 80 via similar hose crimping arrangements as previously described. In-line quick connection coupling valve assemblies suitable for this purpose are sold by Colder Products Company located in St. Paul, Minn.

Hose end 83 connects conduit 75 to the female coupling member 82, while hose end 85 connects conduit 77 to the male coupling member 84. In order to disengage the female coupling member 82 from the male coupling member 84, a clip spring member 91 is compressed, thereby releasing the male coupling member 84 from the female coupling member 82.

In operation, the female coupling member 82 and male coupling member 84 are engaged. When engaged, the quick connect/disconnect valve assembly 80 defines a path for fluid flow therethrough. Thus, when engaged, there is fluid communication between conduits 75 and 77 and thereby between both lower portions of fuel tank 62. In this regard, when the male and female coupling members of the valve assembly 80 are engaged, the fuel levels in both lower portions of the fuel tank 62 remains equal.

Compressing the clip spring member 91 on the outer surface of the female coupling member 82 allow the male coupling member 84 to be disengaged from the female coupling member 82. Poppet valve members (not shown) within both coupling members halt the flow of fuel through the coupling members when the coupling members are disengaged. In this way, after the male coupling member 84 is disengaged from the female coupling member 82, fuel within fuel tank 62 is retained within the conduits 75 and 77, and the fuel tank 62 can be rapidly and safely disassembled from the motorcycle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A fuel equalization device for use with a tank means mounted removably on a vehicle frame to facilitate the removal of the tank means from the vehicle frame, the tank means having a pair of ports for providing fluid communication of fuel contained in the tank means, comprising:

conduit means adapted to be connected in fluid communication to one of the ports for transporting fuel away from the tank means through the port to help provide a uniform fuel level within said tank means;

another conduit means adapted to be connected in fluid communication to the other one of the ports for transporting fuel away from the tank means through the other port;

a separable coupling means disposed in fluid communication between said conduit means and said another conduit means for removably coupling said conduit means and said another conduit means to facilitate removal of the tank means from the vehicle frame; and said coupling means including valve means coupled to said conduit means for controlling the flow of fuel through said conduit means when said coupling means is separated, and said coupling means further including another valve means coupled to said another conduit means for controlling the flow of fuel through said another conduit means when said coupling means is separated, wherein said valve means and said another valve means enable said conduit means and said another conduit means to be decoupled by said coupling means so that the tank means can be readily removed from the vehicle frame without draining the fuel from the tank means.

2. A fuel equalization device according to claim 1, wherein said coupling means further includes a quick connect/disconnect coupling valve assembly having a male coupling member secured to said conduit means and a female coupling member secured to said another conduit means for facilitating the separation of said conduit means from said another conduit means to enable the tank means to be removed from the vehicle frame.

3. A fuel equalization device according to claim 1, wherein said valve means and said another valve means are manual shutoff valves.

4. A fuel equalization device according to claim 3, wherein said valve means and said another valve means have threaded ends to enable said conduit means and said another conduit means to be coupled to one another, said coupling means further includes a sleeve with axially separated internal threads to engage said threaded ends for controlling the coupling of said conduit means and said another conduit means.

5. A fuel equalization device for connection in fluid communication between a pair of ports in a tank means mounted removably on a vehicle to help maintain a uniform fuel level therewithin, comprising:

first conduit means having a pair of ends, with one end connected in fluid communication to one of the ports;

second conduit means having a pair of ends, with one end connected in fluid communication to the other port;

wherein said conduit means are substantially the same length;

separable coupling means for removably connecting in fluid communication the other ends of said conduits;

said coupling means including a valve means for controlling the flow of fuel through said first conduit means and another valve means for controlling the flow of fuel through said second conduit means; and wherein said valve means and said another valve means prevent fuel from flowing out of said other ends when said coupling means is separated between said valve means and said another valve means to enable the tank means to be removed from the vehicle.

6. A fuel equalization device according to claim 5, wherein said valve means and said another valve means are manual shut-off valves connected in fluid communication between said other ends of said first conduit means and said second conduit means.

7. A fuel equalization device according to claim 5, wherein said coupling means further includes a quick connect/disconnect coupling valve assembly having a male coupling member secured to said first conduit means and a female coupling member secured to said second conduit means, said valve means and said another valve means being disposed within said male member and said female member, respectively, for controlling the flow of fluid therethrough when said male member and said female member are disengaged from one another.

8. A method of removing a tank means having a pair of ports from a vehicle frame, comprising:

using a fuel equalization device including a conduit means coupled to one of the ports, another conduit means coupled to the other one of the ports, a valve means secured to said conduit means and another valve means secured to said another conduit means, said fuel equalization device enabling said ports to be connected in fluid communication;

separating said conduit means from said another conduit means to permit the tank means to be removed from the vehicle frame without said fuel equalization device impeding the removal of the tank means;

controlling the flow of fuel through said conduit means and said another conduit means with said valve means and said another valve means, respectively; and removing the tank means from about the vehicle frame without draining fuel from the tank means.

9. A method according to claim 8, further comprising:

using a coupling means having a male coupling member connected to said conduit means and a female coupling member connected to said another conduit means; and disengaging the male coupling member from the female coupling member, wherein said valve means and said another valve means are activated to control the flow of fuel through the disengaged coupling members.

10. A method according to claim 8, further comprising:

using a threaded coupling member to couple said conduit means to said another conduit means, said valve means and said another valve means including a valve assembly and another valve assembly, respectively, having gates and threaded stem ends for cooperating with said threaded coupling member;

closing off the gate of said valve assembly and said another valve assembly to halt the flow of fuel through the pathway defined by the coupled valve assemblies; and unthreading the threaded coupling member from at least one of the valve assembly threaded stem ends to enable said conduit means and said another conduit means to be uncoupled from one another.

* * * * *